United States Patent
Kikuchi (10) Patent No.: US 7,257,072 B2
(45) Date of Patent: Aug. 14, 2007

(54) DIGITAL AUDIO DATA REPRODUCING SYSTEM

(75) Inventor: Tomohiko Kikuchi, Tokyo (JP)

(73) Assignee: TEAC Corporation, Tokyo (JP)

( * ) Notice: Subject to any disclaimer, the term of this patent is extended or adjusted under 35 U.S.C. 154(b) by 493 days.

(21) Appl. No.: 10/602,420

(22) Filed: Jun. 23, 2003

(65) Prior Publication Data

US 2004/0004925 A1    Jan. 8, 2004

(30) Foreign Application Priority Data

Jun. 24, 2002    (JP)    ............... 2002-182923

(51) Int. Cl.
*G11B 27/36*    (2006.01)
(52) U.S. Cl. .................. 369/53.43; 369/4; 381/119
(58) Field of Classification Search ............. 369/53.43, 369/52.1
See application file for complete search history.

(56) References Cited

U.S. PATENT DOCUMENTS

| | | | | |
|---|---|---|---|---|
| 4,980,762 | A * | 12/1990 | Heeger et al. ............... | 382/107 |
| 6,541,690 | B1 * | 4/2003 | Segers, Jr. ................... | 84/605 |
| 6,881,949 | B2 * | 4/2005 | Spencer ................. | 250/231.13 |
| 6,898,165 | B2 * | 5/2005 | Kikuchi ...................... | 369/53.3 |
| 6,961,289 | B2 * | 11/2005 | Liu ............................. | 369/4 |
| 2004/0190409 | A1 * | 9/2004 | Inoue et al. ............... | 369/47.1 |

FOREIGN PATENT DOCUMENTS

| GB | 2361348 A | * | 10/2001 |
|---|---|---|---|
| GB | 2405686 A | * | 3/2005 |
| JP | 09-293201 | | 11/1997 |
| WO | WO 97/01168 | * | 1/1997 |
| WO | WO 200021090 A1 | * | 4/2000 |

OTHER PUBLICATIONS

"Logitech Marble TM Optical Technology White Paper" (Logitech, Inc. Published Jan. 23, 2002. <http://www.logitech.com/lang/pdf/marble_wp.pdf>. pp. 1-6).*

* cited by examiner

*Primary Examiner*—William Korzuch
*Assistant Examiner*—Nathan Danielsen
(74) *Attorney, Agent, or Firm*—Katten Muchin Rosenman LLP (57) ABSTRACT

A digital audio data reproducing system includes a digital audio data reproducing apparatus having a record medium, a detection part for the record medium and a processing unit; an analog record player; and a rotation detecting apparatus for sensing the speed and sense of revolution of an analog record. The rotation detecting apparatus is provided for easily controlling audio data in the other electrical appliances by an analog record in which audio data is stored. The scratch operation of the analog record together with the reproduction of the analog record by a player allows the rotation body to be rotated around a shaft in accordance with the rotation of the analog record. A rotary encoder senses the speed of revolution and the direction of rotation for the rotation body to output pulse signals, and the audio data in the data reproduction apparatus are scratch-controlled on the basis of the pulse signals.

1 Claim, 8 Drawing Sheets

DIGITAL AUDIO DATA REPRODUCING SYSTEM

BACKGROUND OF THE INVENTION

1. Field of the Invention

The present invention relates to a digital audio data reproducing system for reproducing digital audio data in accordance with the reproducing speed and reproducing direction which is determined by an operator, that is, for carrying out the so-called "scratch play".

2. Description of the Related Art

It is well known that a scratch operation is used to generate a special sound by changing the speed of revolution and the direction of rotation for an analog record, in which case, the analog record is compulsively rotated by a manual operation of a turntable in an analog record player. In recent years, several scratch reproducing methods for controlling the reproduction of digital audio data are employed in a digital audio reproducing apparatus, wherein a jog dial and/or the turntable for the analog record player is scratch-operated. In particular, a scratch reproduction method is known, in which a specific analog record in which audio signals representing corresponding time codes are stored is placed on a turntable of an analog record player, and audio data on the specific record are reproduced with a conventional cartridge, so that, for example, the reproduction of digital audio data in a CPU are controlled by the time code. In such a specific analog record, the time code data are modulated/converted into signals in a range of an audio signal frequency with the known modulation method, such as FSK modulation, and the data thus converted are stored. In other words, the analog record player is used as device having a function, which is identical with the jog dial, and the reproduction operation in a digital audio device is controlled by the reproduced time code.

In the above-mentioned conventional scratch reproduction method wherein the reproduction operation in the digital audio devices is controlled by the record player, such a specific analog record, in which the time code signals are stored, is reproduced by an analog record player, instead of a usual analog record. As a result, it is impossible to instantly exchange the scratch reproduction of the usual analog record for the reproduction of the specific analog record and vice versa.

When intending to reproduce a normal analog record, it is necessary to supply to an analog audio amplifier an output of a pick up, which is used as a control signal for a digital audio apparatus, as well as to exchange such a specific analog record for an usual analog record on the turntable. These cause a troublesome work to be provided.

SUMMARY OF THE INVENTION

Accordingly, it is an object of the present invention to provide a novel digital audio data reproducing system capable of eliminating the troublesome operations in the scratch reproducing method, wherein the reproducing operation to be carried out, exchanging the specific analog record for the usual analog record and vice versa. It is another object of the present invention to provide a novel audio data reproducing system having a simple structure so that it may be produced at reduced cost of manufacturing.

The above-mentioned object of the present invention is attained by the following digital audio data reproducing systems:

In accordance with a first aspect of the present invention, a digital audio data reproducing system comprises a digital audio data reproducing apparatus including a recording medium in which digital audio data are stored, detection means for detecting the digital audio data stored in the recording medium and a processing section for reproducing the digital audio data in accordance with the reproducing speed signal and reproducing direction signal which are supplied from the outside to the detection means; an analog player including a turntable for an analog record or a disk similar thereto and rotation driving means for the turntable; and a rotation detecting apparatus mounted onto the analog record player for detecting both the speed of revolution and the sense of rotation for either the turntable or the analog record or a disk similar thereto, which is rotated by the turntable, and for supplying the reproducing signal and the reproducing direction signal to the digital audio data reproducing apparatus, after determining the reproducing signal and the reproducing direction signal from the detection signals for the speed of revolution and the sense of rotation.

In accordance with a second aspect of the present invention, the rotation detection apparatus comprises a rotation body which is rotated by either the turntable or the analog record or a disk similar thereto in contact therewith; and a rotary encoder including an encoder disk connected to the rotary shaft of the rotation body and a photoelectric detector for sensing the encoder disk.

In accordance with a third aspect of the present invention, the rotation detecting apparatus further comprises supporting means for changing the rotation body and the rotary encoder from a first position at which the rotation body and the rotary encoder is in contact with the analog record or a disk similar thereto to a second position at which the rotation body and the rotary encoder is away from the analog record or a disk similar thereto and vice versa by the operation of an operator.

In accordance with a fourth aspect of the present invention, the rotation detecting apparatus comprises an image sensor for reading the surface of said analog record or a disk similar thereto as image data; and a processing unit for determining the reproducing speed signal and the reproducing direction signal to be output on the basis of the image data supplied from the image sensor.

In accordance with a fifth aspect of the present invention, the rotation detecting apparatus is further equipped with at least switch means for transmitting/interrupting the reproducing speed signal and the reproducing direction signal to the digital audio data reproducing apparatus by the operation of an operator at the output of the processing unit in the rotation detecting apparatus.

Furthermore, in accordance with the digital audio data reproducing system of the present invention, any specific analog record including the time code is not used. Accordingly, there is no longer any need for exchanging the analog record for the specific analog record and vice versa in accordance with the required playing mode, thereby enabling the operation of processing audio signal, in particular the operation of the scratch reproduction, to be significantly simplified.

In accordance with the digital audio data reproducing system of the present invention, there is no special requirement for modifying the digital audio data reproducing apparatus and therefore it is available from the market without any difficulty. Moreover, the rotation detecting apparatus according to the present invention can easily be adapted to the conventional analog player without any substantial modification of the basic structure thereof. In addition, the rotation detecting apparatus according to the present invention has a simple structure and therefore may be produced by a very small number of parts. As a result, the digital audio data reproducing system can be manufactured with ease as well as with small cost.

Moreover, only an operation of a single record player permits instantly switching between the scratch reproduction sound from an analog record and the scratch reproduction sound from the digital audio apparatus. Accordingly, there is no need for provision of a plurality of record players for a player (an operator), thereby enabling the space for playing to be reduced.

Moreover, the operation of scratch-reproducing the sound from an analog record and that of scratch-reproducing the sound from the digital audio apparatus may be simultaneously carried out by the operation of a single record player. Accordingly, the degree of freedom in playing is increased for a player (an operator), and therefore the digital audio data reproducing system according to the present invention is particularly useful.

Other objects, features and advantages of the present invention will become apparent from the following description of the preferred embodiments with reference to the accompanying drawings.

DETAILED DESCRIPTION OF THE PREFERRED EMBODIMENTS

Referring now to the accompanying drawings, which show the preferred embodiments, the present invention will be described in detail.

(Embodiment 1)

Figure 1:
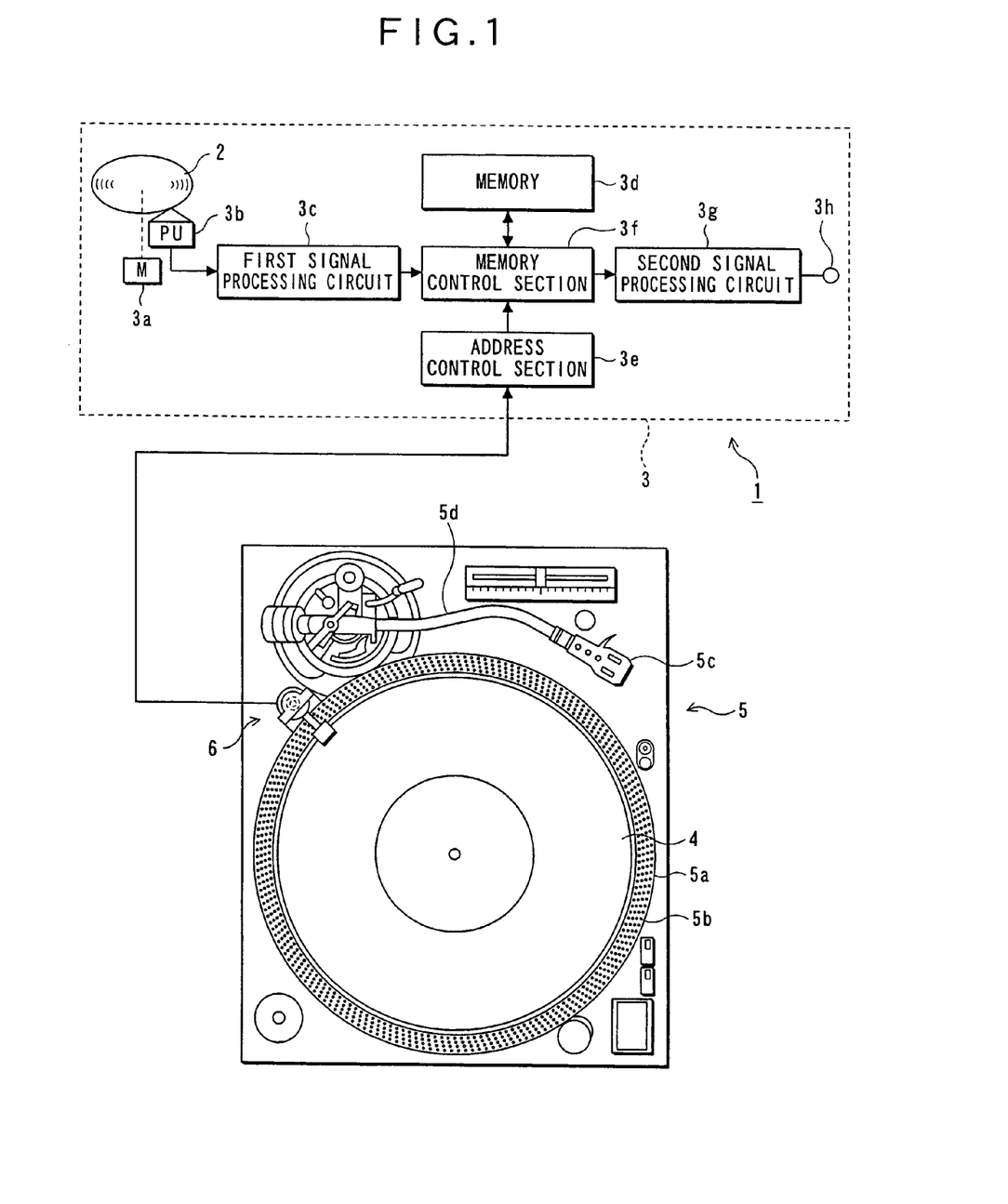
FIG. 1 is a schematic diagram showing the function of a scratch reproduction system in which a rotation detecting apparatus according to a first embodiment of the invention is included.

FIG. 1 is a block diagram schematically showing a scratch reproduction system in which a rotation detecting apparatus according to a first embodiment of the invention is used.

In the scratch reproduction system 1, a data reproduction apparatus 3 is controlled in such a manner that it reproduces audio data in accordance with the scratch operation of an analog record player 5. As shown in FIG. 1, the scratch reproduction system 1 comprises an optical disk 2, a data reproduction apparatus 3, an analog record 4, an analog record player 5 and the rotation detecting apparatus 6.

The optical disk 2, in which audio data are stored, is realized by a compact disk, a mini disk having a 64 mm diameter, or the like. The data reproduction apparatus 3 is used as an apparatus for reproducing the audio data stored in the optical disk 2. The data reproduction apparatus 3 comprises a spindle motor $3a$ for rotating the optical disk 2, an optical head $3b$ for reading the audio data stored in the optical disk 2, a first signal processing circuit $3c$ for processing the output signal from the optical head $3b$, a memory (RAM) $3d$ for storing the audio data supplied from the first signal processing circuit $3c$, an address control section $3e$ for generating an address on the basis of an output signal of the rotation detecting apparatus 6 to read the audio data stored in the memory $3d$, a memory control section $3f$ for reading the audio data from the memory $3d$ on the basis of the address to output the data thus read, a second signal processing circuit $3g$ for converting the digital signal supplied from the memory control section $3f$ into an analog signal, and an output terminal $3h$ for outputting the analog signal from the second signal processing circuit $3f$.

The analog record 4 is an analog disk (a record disk) in which the audio data are stored in the form of a modulated groove. The analog record player 5 is used as an apparatus for reproducing the audio data stored in the analog record 4. The analog record player 5 comprises a turntable $5a$ for rotating the analog record 4 placed thereon, a mat $5b$ interposed between the turntable $5a$ and the analog record 4, a head shell $5c$ onto which a stylus is mounted, and a tone arm $5d$ for removably supporting the head shell $5c$ and capable of rotating it in the horizontal direction. In the analog record player 5, the tone arm $5d$ is designed to be farthest away from a player, such as a disk jockey (DJ), in such a way that he provides no trouble, when he performs the scratching operation for the analog record 4. However, the tone arm can be located in the normal position as employed for some players.

Figure 2A:
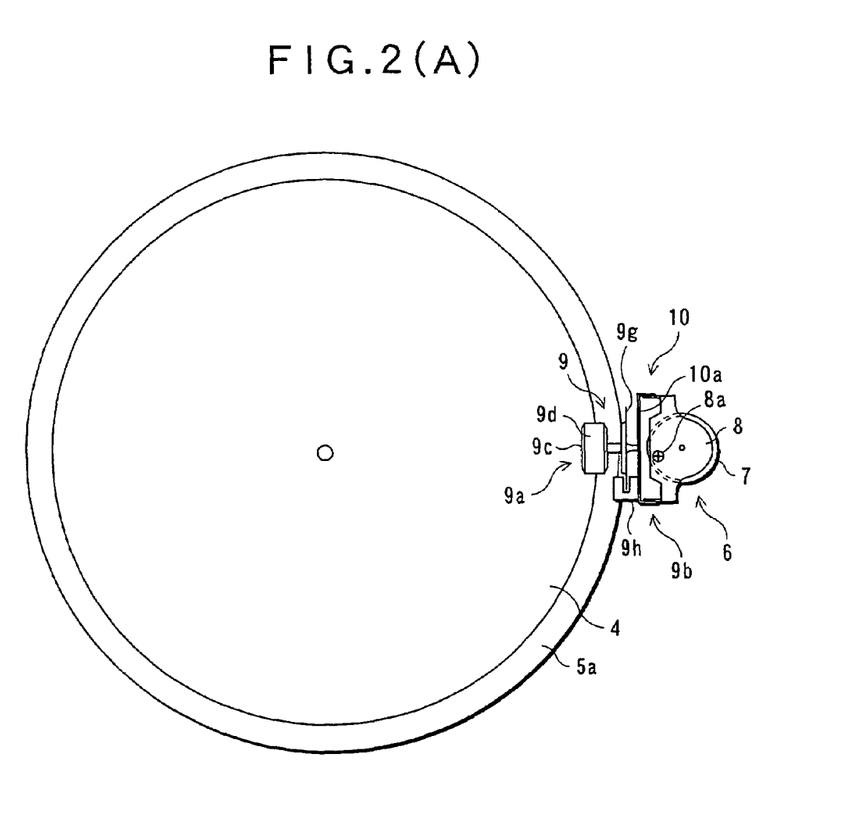
FIG. 2A is a plan view of the rotation detecting apparatus according to the first embodiment of the invention which is mounted onto an analog record player.
Figure 2B:
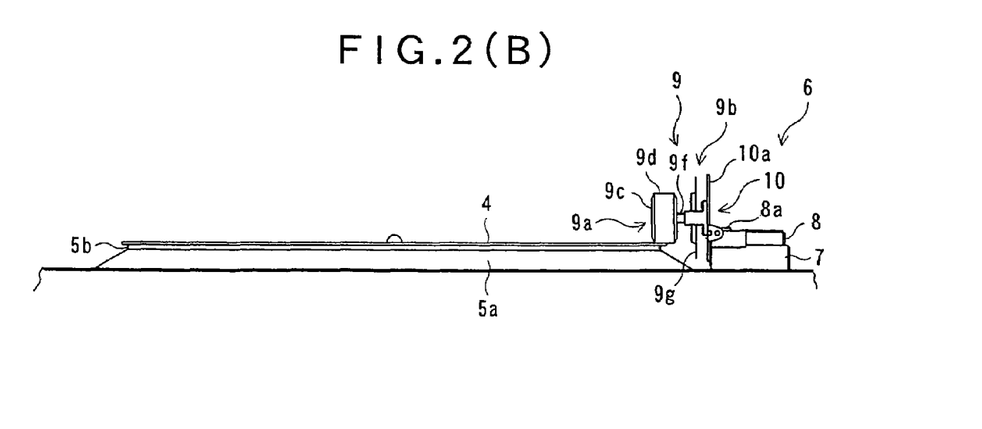
FIG. 2B is a side view of the rotation detecting apparatus according to the first embodiment of the invention which is mounted onto an analog record player.
Figure 3:
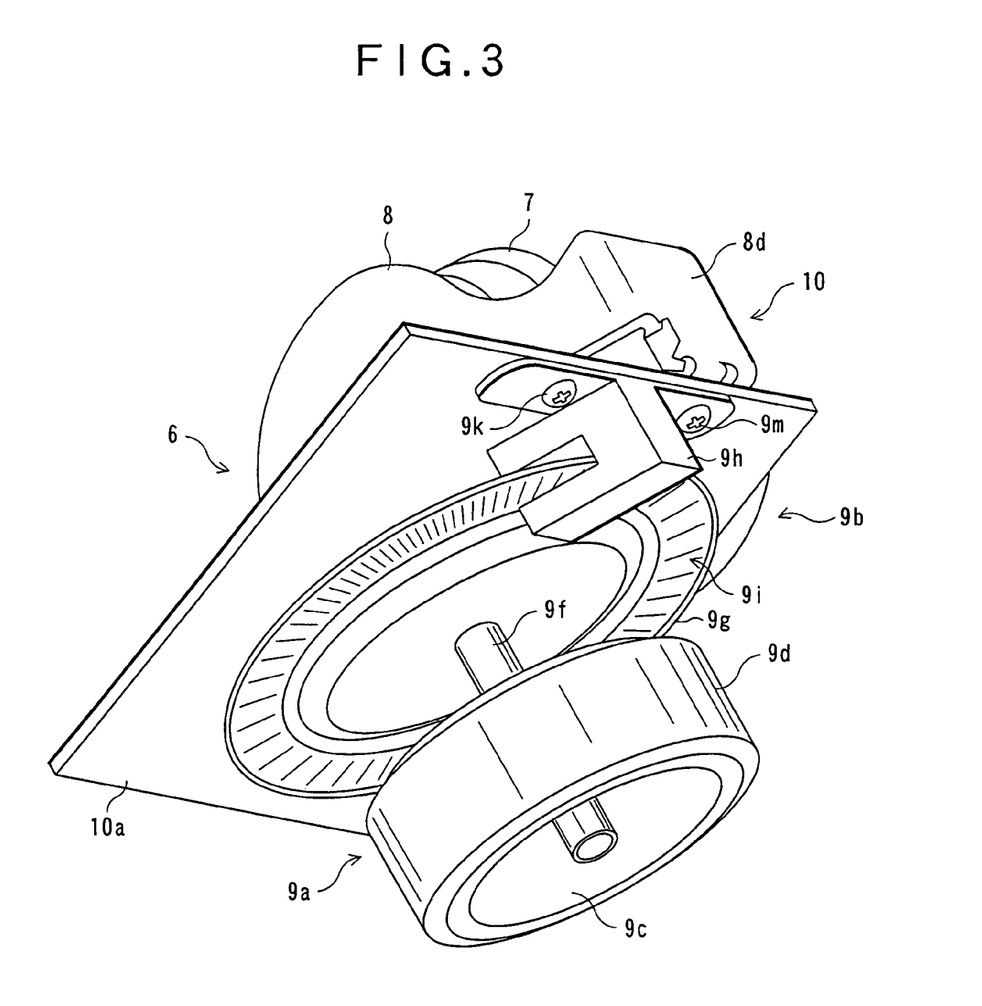
FIG. 3 is a perspective view of the rotation detecting apparatus according to the first embodiment.
Figure 4:
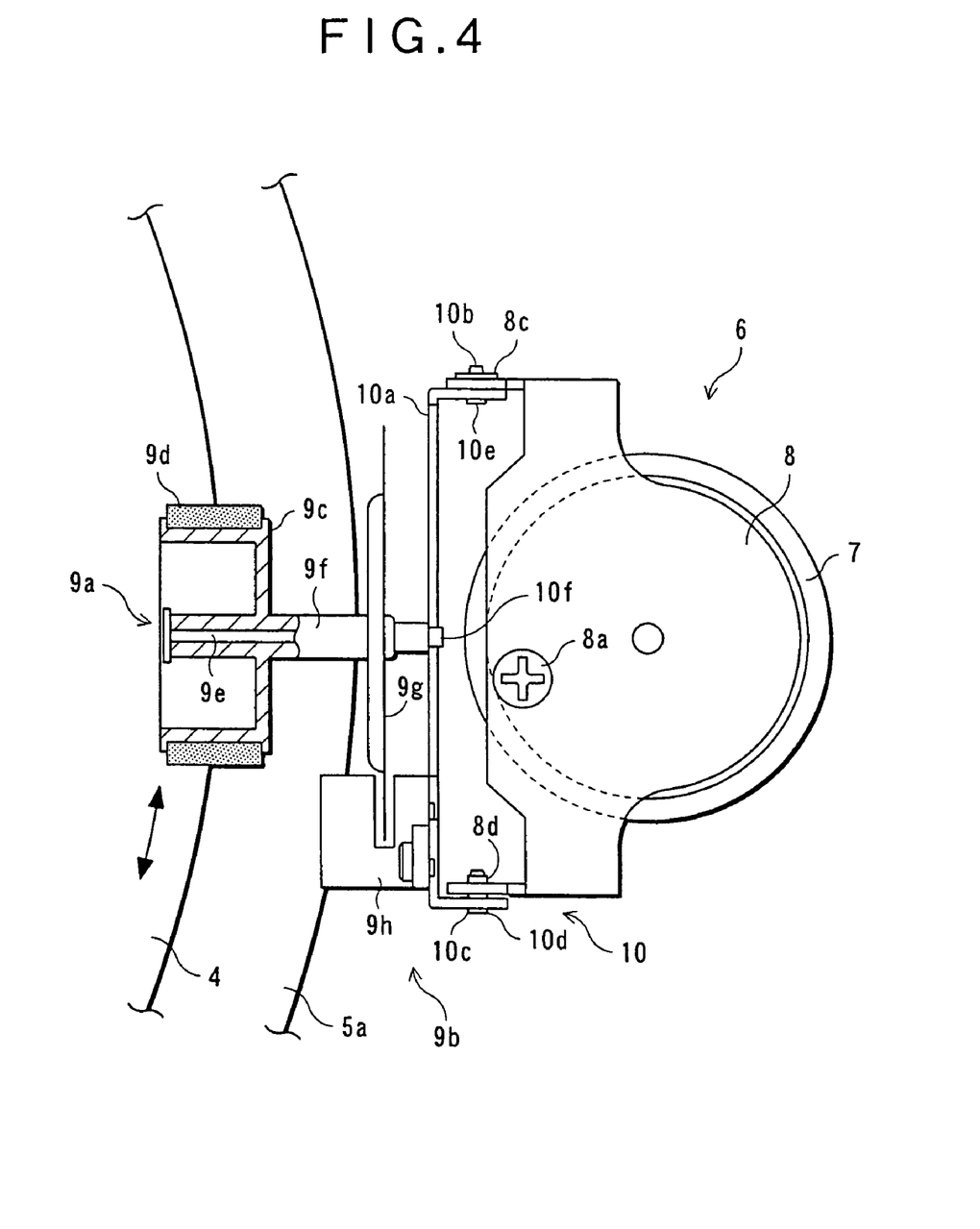
FIG. 4 is a plan view of the rotation detecting apparatus according to the first embodiment.
Figure 5:
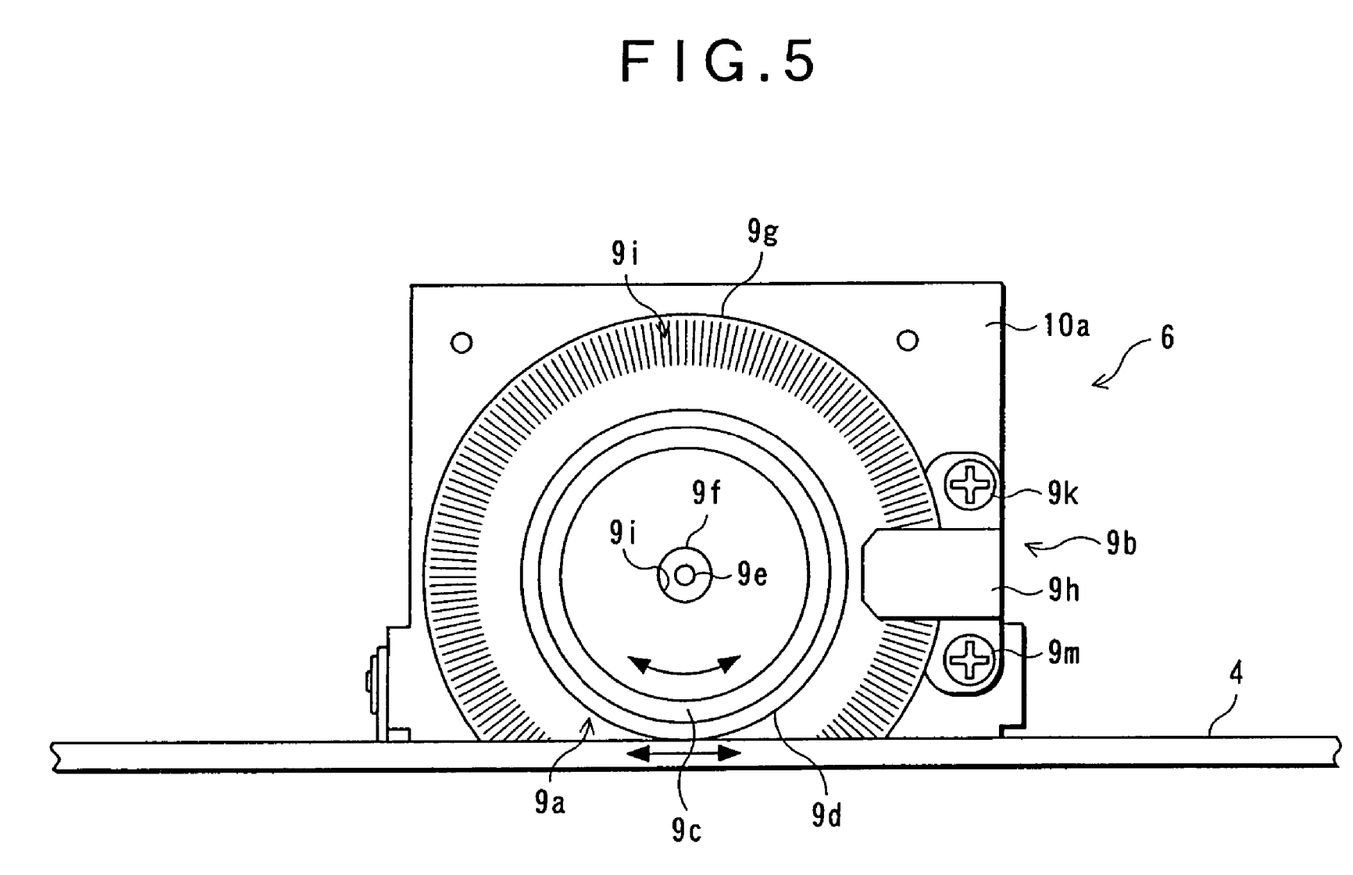
FIG. 5 is a side view of the rotation detecting apparatus according to the first embodiment.
Figure 6:
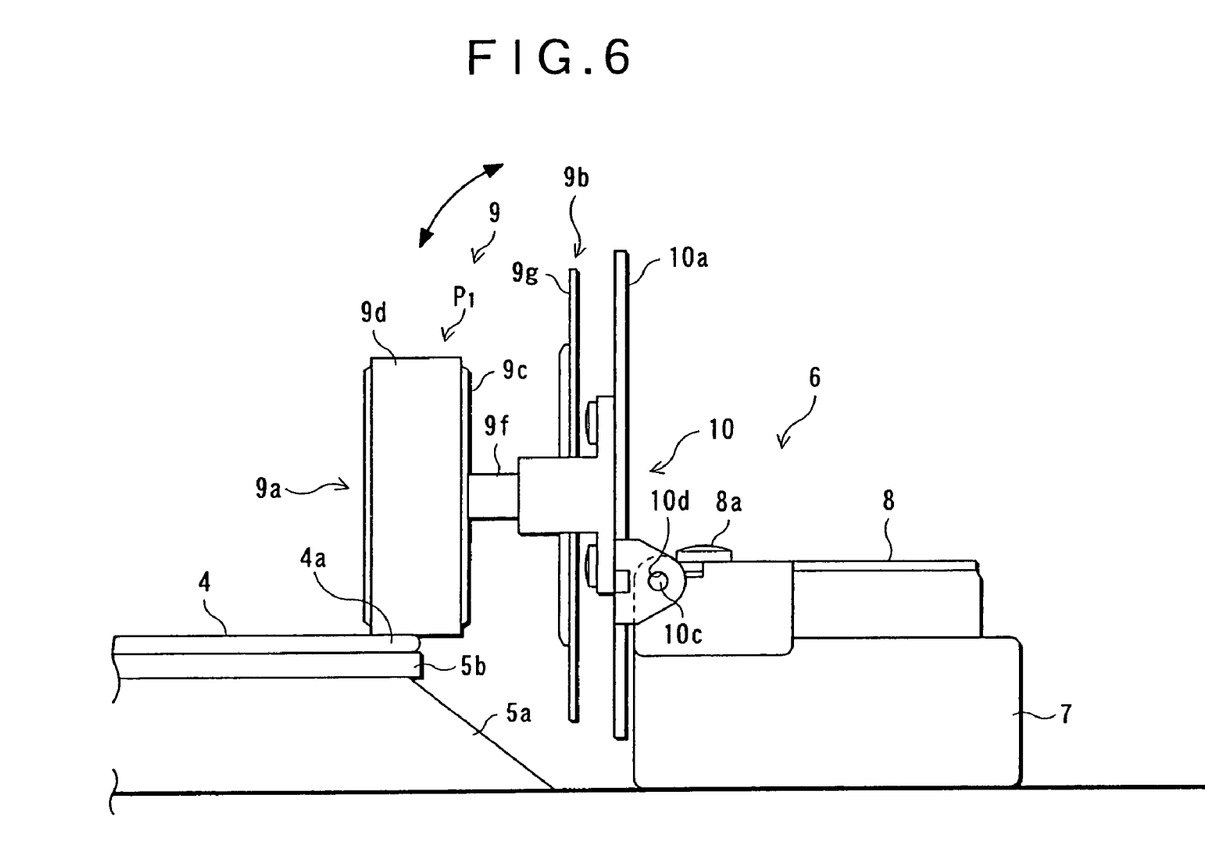
FIG. 6 is a front view of the rotation detecting apparatus according to the first embodiment in the case of the detection operation (ON).
Figure 7A:
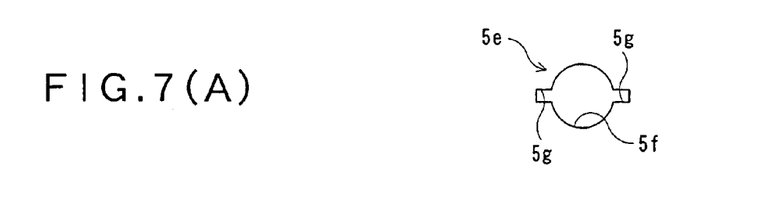
FIG. 7A is a plan view showing the shape of a shell stand hole in a turntable.
Figure 7B:
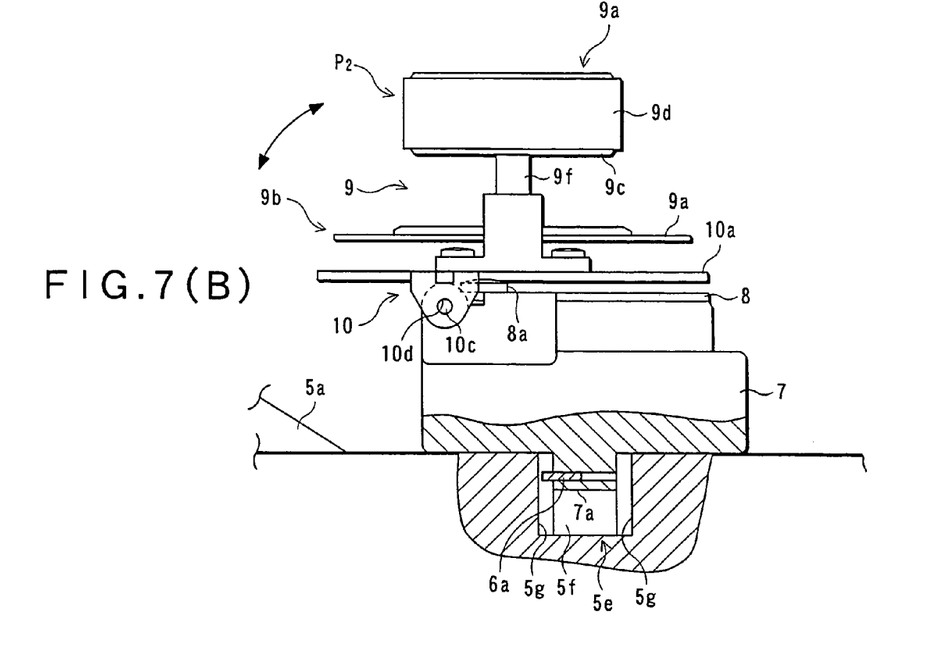
FIG. 7B is a front view showing the state of the rotation detecting apparatus mounted on the shell stand hole.
Figure 7C:
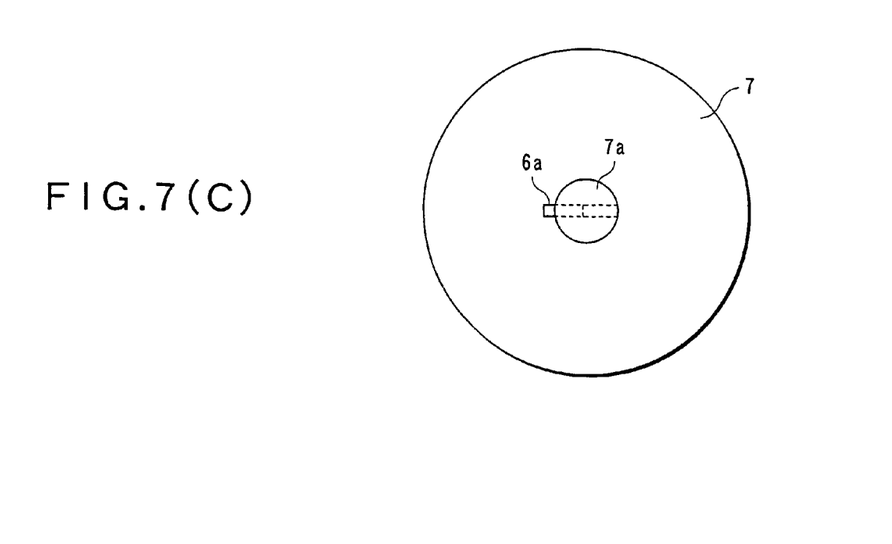
FIG. 7C is a bottom view of the rotation detecting apparatus.

FIGS. 2(A) and 2(B) show the analog record player in which the rotation detecting apparatus according to the first embodiment of the invention is mounted: FIG. 2A is a plan view of the rotation detecting apparatus according to the first embodiment of the invention, in which case, the rotation detecting apparatus is mounted on the analog record player. FIG. 2B is a front view of the rotation detecting apparatus in the same state. FIG. 3 is a perspective view of the rotating detecting apparatus according to the first embodiment of the invention. FIG. 4 is a plan view of the rotation detecting apparatus according to the first embodiment of the invention. FIG. 5 is a side view of the rotation detecting apparatus according to the first embodiment of the invention. FIG. 6 is a front view of the rotation detecting apparatus according to the first embodiment of the invention in the state of the detecting operation (ON). FIG. 7 is a front view of the rotation detecting apparatus according to the first embodiment of the invention in the state of the non-detecting operation (OFF). FIG. 7A is a plan view showing the shape of a hole in a shell stand of the turntable, FIG. 7B is the front view showing the rotation detecting apparatus mounted into the hole in the shell stand, and FIG. 7C is a bottom view of the rotation detecting apparatus.

The rotation detecting apparatus 6 is used as a device for sensing the speed of revolution and the sense of rotation either in the analog record 4 in which audio data are stored or the turntable 5 which are moved resulting from the scratch play by a player, i.e., an operator. As shown in FIG. 2-FIG. 7, the rotation detecting apparatus 6 comprises a base element 7, a chassis 8, a sensing section 9, and a switching section 10. The base element 7 can be removably mounted onto the analog record player 5. The base element 7 is a cylindrical metal body having heavy weight and has a shell stand 5e and a fitting pin 6a fitted thereinto. The fitting pin 6a is pushed into a projection part 7a formed at the center of the bottom surface of the base element 7, as shown in FIGS. 7(B) and 7(C), and an end of the fitting pin 6a is projected from the side surface of the projection part 7a. As shown in FIG. 7(A), the turntable 5 includes a shell stand 5e in which the head shell 5c may be removably mounted. The shell stand 5e includes a fitting hole 5f into which a projection part 7a is fitted, and an engaging groove 5g, with which the fitting pin 6a is engaged, is formed on the inside wall surface of the fitting hole 5f. The chassis 8 is used as an element for connecting a supporting element 10a to the base element 7, and fixed to the base element 7 by a screw 8a, as shown in FIG. 4. Moreover, the chassis 8 includes through holes 8c and 8d, through which supporting shafts 10b and 10c pass, respectively.

The detecting section 9 is used as a device for detecting the revolution speed and the rotary direction of the analog record 4. The detecting section 9 provides data for the speed of revolution and data for the direction of rotation to control the audio data output from the data reproduction apparatus 3 shown in FIG. 1. The detecting section 9 is removably mounted on the analog record player 5 and disposed in a position, where no trouble occurs when a player tries to carry out the scratch operation of the analog record 4. As shown in FIG. 4-FIG. 7, the detecting section 9 is equipped with a rotation body 9a and a rotary encoder 9b.

The rotation body 9a is rotatably in contact with the analog record 4. The rotation body 9a comprises a roller section 9c, a slip preventing element 9d and a rotary shaft 9f. The roller section 9c is a cylindrical element made of a synthetic resin, such as a plastic material, and the slip preventing element 9d is an annular gum for increasing the frictional force against a thick portion (groove guard) 4a in the outer surrounding of the analog record 4, when the slip preventing element 9d comes into contact with the thick portion 4a. The slip preventing element 9d is mounted onto the outer surface of the roller section 9c. A center shaft 9e is a rotary shaft passing through the center of the rotary shaft 9f, which is unified to the roller section 9c.

The rotary encoder 9b is a device for sensing the speed of revolution and the direction of rotation for the rotary element 9a. The rotary encoder 9b comprises an encoder disk 9g and a photo-interrupter 9h. The encoder disk 9g includes dark stripes 9i printed in the radial direction on a disk-shaped polyester film and an engaging hole 9j coupled to the rotary shaft 9f, as shown in FIG. 5. The encoder disk 9g is fixed to the rotary shaft 9f with an adhesive or the like, such that it is rotated together with the roller section 9c. The photo-interrupter 9h is a photoelectric element for converting an optical signal into an electrical signal. The photo-interrupter 9h is fixed to the supporting element 10a by screws 9k and 9m, such that the dark stripes 9i of the encoder disk 9g pass through a space between a light emitting element and a light receiving element. The photo-interrupter 9h generates two different phase pulse signals in response to the rotation of the encoder disk 9g, thereby enabling the rotary direction to be detected from the phase difference between the pulse signals and further the speed of revolution to be detected from the pulse width of the pulse signals. The photo-interrupter 9h supplies both the data for the speed of revolution thus detected and the data for the direction of rotation thus detected to the address control section 3e shown in FIG. 1.

The switching section 10 is used as an element for switching the detection mode of the detecting section 9 between a detection state and a non-detection state. The switching section 10 is equipped with a supporting element 10a and supporting shafts 10b and 10c, as shown in FIG. 4. The supporting element 10a is a plate-like element for supporting the detecting section 9. The supporting element 10a includes through holes 10d and 10e through which the supporting shafts 10b and 10c pass respectively, and an end of a shaft 10f is fixed to the supporting element 10a. As shown in FIG. 6 and FIG. 7, the supporting element 10a provides a switching action between a rotary position $P_1$ in which the rotation body 9a is in contact with the analog record 4 and a rotary position $P_2$ in which the rotation body 9a is far away from the analog record 4. The support shafts 10b and 10c serve to rotatably connect the support element 10a to the chassis 8, and further serve to act as fixing points for rotating the supporting element 10a.

In the following, the function of the rotation detecting apparatus according to the first embodiment of the invention will be described.

As shown in FIGS. 4 and 6, when the supporting element 10a is rotated into the rotary position $P_1$ around the supporting shaft 10b and 10c, the slip preventing element 9d is in contact with the thick portion 4a of the analog record 4 due to the weight of the supporting element 10 and others. As a result, the frictional force between the slip preventing element 9d and the analog record 4 allows the rotation body 9a to be in a rotatable state by the analog record 4, so that the detecting section 9 changes from the non-detecting operation state to the detecting operation state. When a player tries to scratch-operate the analog record 4 in the state of reproducing the analog record 4 by the rotation of the turntable 5a, the rotation body 9a is rotated around the center of the shaft 9e in accordance with the rotation of the analog record 4.

The rotation of the rotation body 9a allows the rotary encoder 9b to detect the speed of revolution and the direction of rotation for the rotation body 9a, and therefore to supply the data for the speed of revolution and the data for the direction of rotation in the pulse signals to the address control section 3e, as shown in FIG. 1. When the address control section 3e address-controls the memory control section 3f on the basis of the pulse signals, the memory control section 3f controls the speed and direction of reading the audio data stored in the memory 3d, thereby enabling the audio data to be scratch-controlled in the data reproduction apparatus 3. On the other hand, when the supporting element 10a is rotated into the rotary position $P_2$ around the supporting shafts 10b and 10c, as shown in FIGS. 4 and 7, the rotation body 9a departs from the thick portion 4a of the analog record 4, thereby changing from the detection operation state to the non-detection operation state.

When the player tries to carry out the scratch operation, along with the reproduction of the analog record 4 in the state in which the rotation body 9a and the analog record 4 are in contact with each other, as shown in FIG. 6, the analog record 4 is scratch-reproduced, and the data reproduction apparatus 3 scratch-reproduces the audio data in synchronization with the scratch operation of the player. Subsequently, the tone arm 5d is raised to remove the head shell 5c from the analog record 4, so that the reproduction of the audio signal recorded in the analog record 4 is interrupted. When, therefore, the player tries to carry out the scratch operation without reproducing the analog record 4, the data reproduction apparatus 3 scratch-reproduces the audio data in synchronization with the scratch operation of the player. On the other hand, when the player tries to carry out the scratch operation of the analog record 4 with reproduction thereof in the state in which the rotation body 9a is apart from the analog record 4, as shown in FIG. 7 and further to lower the tone arm 5d such that the head shell 5c becomes in contact with the analog record 4, only the analog record 4 is scratch-reproduced, thereby allowing the audio data to be reproduced by the data reproduction apparatus 3.

Since, therefore, the rotation detection apparatus according to the invention is capable either of being coupled to the turntable 5a on which the analog record 4 is placed or of being apart therefrom, a player or an operator has a similar sense of operation as in the operation of the tone arm 5d and head shell 5c of the analog player 5 in the data reproducing apparatus 3.

The rotation detection apparatus according to the first embodiment of the invention has the following advantages:

(1) In accordance with the first embodiment, the detecting section 9 detects the speed of revolution and the direction of rotation for the analog record 4 in which the audio data are stored, and the detecting section 9 outputs the data for the speed of revolution and the data for the direction of rotation to control the audio data which are supplied from the data reproduction apparatus 3. As a result, the audio data in the data reproduction apparatus 3 can be controlled only by the scratch operation of the analog record 4 in which the audio data are stored, without any usage of the analog record for exclusive use in which the time code is recorded, as in the conventional scratch reproduction method. Since, moreover, there is no need of placing an analog record for exclusive used on the turntable 5a, the audio data stored in the optical disk 2 may be reproduced by the data reproduction apparatus 3, along with the reproduction of the analog record 4 in which the audio data are stored.

(2) In accordance with the first embodiment, the rotatable contact of the rotation body 9a with the analog record 4 allows the rotary encoder 9b to detect the speed of revolution and the direction of rotation for the rotation body 9a. As a result, it is possible to manufacture the rotation detection apparatus 6 having a simple structure with reduced cost. Moreover, the rotation detection apparatus 6 can easily be mounted onto a conventional analog player 5. In addition, there is no need of reproducing the time data stored in a specific analog record with a stylus, as in the conventional scratch reproduction method, thereby making it possible to suppress the consumption of stylus in the scratch reproduction of digital audio data.

(3) In accordance with the first embodiment, the analog record player 5 itself also has the scratch operation means for the data reproduction apparatus 3. This provides a very simple and easy user's interface for a player skilled in the scratch operation of an analog record player. Furthermore, music data can also be reproduced from the data reproduction apparatus 3 together with the reproduction of the analog record by the analog record player 5. Hence, a player can immediately switch the scratch sound range or the reproduction sound from two audio sound sources by the scratch operation of the analog record, simultaneously operating a switch or a manipulator for selectively switching the audio output from the analog record player 5 and the audio output from the data reproduction apparatus 3. In addition, the rotation detection apparatus according to the invention is capable either of being coupled to the turntable 5a on which the analog record 4 is placed or of being apart therefrom, a player or an operator has a similar sense of operation as in the operation of the tone arm 5d and head shell 5c of the analog player 5 in the data reproducing apparatus 3. Accordingly, by the up and down movement of the rotation body 9a, as similarly to the up and down operation of the tone arm 5d, the sound reproduced from the analog record and the sound reproduced from the data reproduction apparatus 3 may be selectively or simultaneously output without any provision of a selection switch.

(Embodiment 2)

Figure 8:
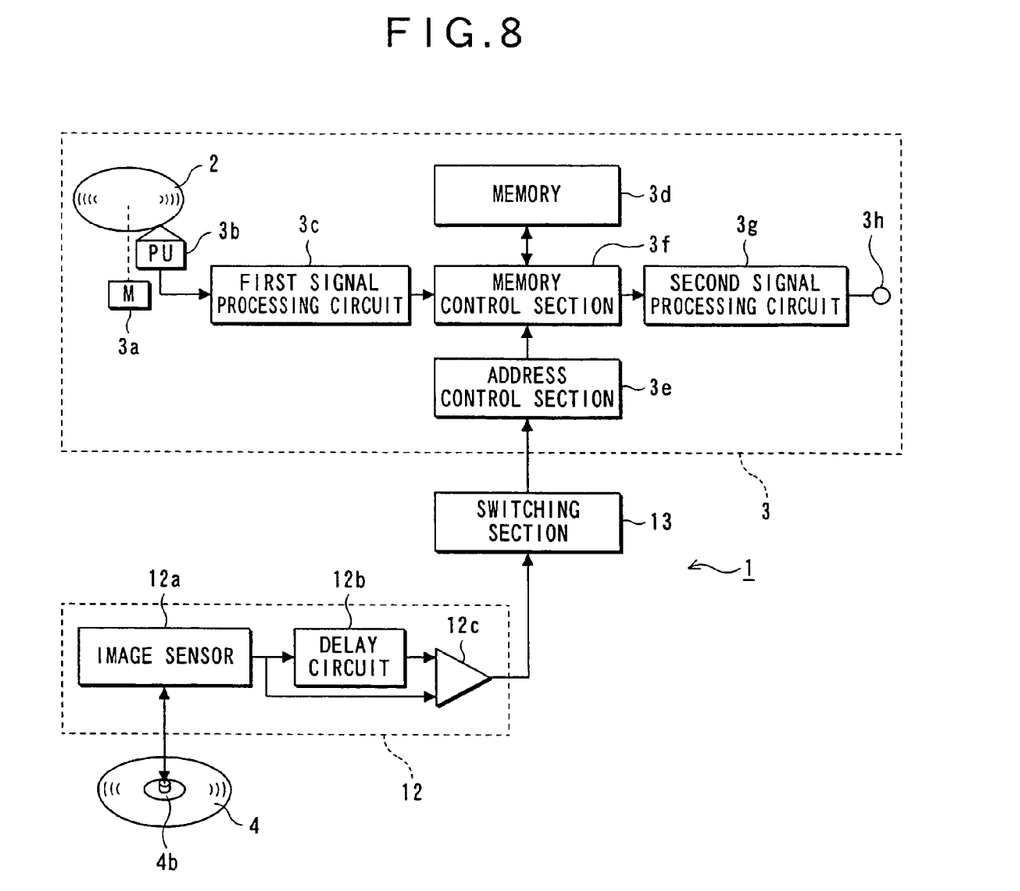
FIG. 8 is schematic diagram showing a scratch reproduction system equipped with a rotation detecting apparatus according to a second embodiment of the invention.

FIG. 8 is a schematic diagram showing a scratch reproduction system in which a rotation detecting apparatus according to a second embodiment is installed. In this case, the same reference numeral is used for each of the same elements as those in FIGS. 1-7, and the description thereof is omitted.

A rotation detecting apparatus 11 comprises a detecting section 12 and a switching section 13, as shown in FIG. 8. The detecting section 12 includes an image sensor 12a, a delay circuit 12b and a comparator 12c.

The image sensor 12a is capable of reading data in the analog record 4 as image data. Light irradiates the label surface 4b of an analog record 4 and the image sensor 12a always receives the light reflected therefrom to form image data, and then image data are supplied to the delay circuit 12b and the comparator 12c. The delay circuit 12b supplies the image data delayed in a predetermined time, and the comparator 12c detects the speed of revolution and the direction of rotation for the analog record 4, based on the change in the image data. Subsequently, the comparator 12c compares the image data supplied from the image sensor 12a and the image data supplied from the delay circuit 12b, and then determines the speed of revolution and the direction of rotation for the analog record 4.

The switching section 13 serves as an electrical switch, which enables (ON) or disenables (OFF) the pulse signal supplied from the comparator 12c and switches between the detecting operation state and the non-detecting operation state of the detecting section 12. In the second embodiment, the scratch operation of the analog record 4 can be detected without any contact, along with the function obtainable from the rotation detecting apparatus according to the first embodiment.

(The Other Embodiments)

1. In the description of the first or second embodiment, the data reproduction apparatus 3 is exclusively elucidated as an example. In one of the other embodiments, however, the parameters of the other electrical instruments, such as a mixer, effecter or the like, can be controlled real time in conjunction with the scratch operation of the analog record 4 to change the echo time and/or the center frequency. In the first embodiment, moreover, the switching between the detecting operation state and the non-detecting operation state of the detecting section 9 is carried out with the aid of the rotation of the supporting element 10a. In one of the other embodiments, however, the switching can be carried out, using an electric switch.

2. In the first embodiment, the revolution speed and the rotary direction of the analog record 4 are sensed with the aid of the rotation body 9a. In one of the other embodiments, however, a filter circuit or the like can be disposed to remove signal components at the specific frequency from the signal output from the detecting section 9, in order to protect the audio data on the side of the data reproduction apparatus 3 against the effect of the noise resulting from a variation in the rotation of the rotation body 9a. Moreover, in the second embodiment, the image data on the label surface 4b of the analog record 4 is sensed. In one of the other embodiments, the image data can be read from the recording grooves of the analog record 4, using an image sensor 12a having a greater resolving power.

While preferred embodiments have been shown and described, various modifications and substitutions may be made without departing from the spirit and scope of the invention. Accordingly, it is to be understood that the present invention has been described by way of example, and not by limitation.

What is claimed is:

1. A digital audio data reproducing system comprising:
   a digital audio data reproducing apparatus including a recording medium in which digital audio data are stored, detection means for detecting the digital audio data stored in said recording medium and a processing section for reproducing said digital audio data in accordance with a reproducing speed signal and a reproducing direction signal which are supplied from the outside to said detection means;
   an analog record player including a turntable for an analog record and rotation driving means for said turntable; and
   a rotation detecting apparatus mounted onto said analog record player for detecting both the speed of revolution and the direction of rotation for either said turntable or said analog record, which is rotated by said turntable, and for supplying said reproducing speed signal and said reproducing direction signal to said digital audio data reproducing apparatus, after determining said reproducing speed signal and said reproducing direction signal from the detection signals for the speed of revolution and the direction of rotation,
   wherein said rotation detection apparatus includes:
      a rotation body which is rotated by either said turntable or said analog record in contact therewith; and
      a rotary encoder including an encoder disk connected to a rotary shaft of said rotation body and a photoelectric detector for sensing said encoder disk, and
   wherein said rotation detecting apparatus further includes supporting means for changing said rotation body and said rotary encoder from a first position at which said rotation body and said rotary encoder is in contact with said analog record to a second position at which said rotation body and said rotary encoder is away from said analog record and vice versa by the operation of an operator.

* * * * *